United States Patent [19]
Heimlich et al.

[11] 3,875,976
[45] Apr. 8, 1975

[54] INNERSPRING MANUFACTURING EQUIPMENT

[75] Inventors: Bernard M. Heimlich; Chester R. Yates; Leonard M. Cox, all of Carthage, Mo.

[73] Assignee: Frank L. Wells Company, Kenosha, Wis.

[22] Filed: July 26, 1973

[21] Appl. No.: 382,926

[52] U.S. Cl. ............................................ 140/92.94
[51] Int. Cl. ............................................... B21f 27/16
[58] Field of Search .............. 140/92.3, 92.8, 92.94; 74/110

[56] References Cited
UNITED STATES PATENTS

| | | | |
|---|---|---|---|
| 1,907,323 | 5/1933 | Kirchner | 140/92.94 |
| 2,282,664 | 5/1942 | Marcus et al. | 140/92.94 |
| 2,765,815 | 10/1956 | Gauci | 140/92.94 |
| 3,543,903 | 12/1970 | Lodige | 74/110 |
| 3,682,206 | 8/1972 | Kirchner | 140/92.94 |

Primary Examiner—Lowell A. Larson
Attorney, Agent, or Firm—Russell H. Clark

[57] ABSTRACT

Disclosed is equipment for joining together parallel rows of coiled springs by means of helical wires. Two rows of spaced clamps hold two parallel rows of coiled springs which overlap at the spring ends while the helical wires are wound about the overlap of the springs. The equipment includes an assembly for opening and closing the clamps with minimum wear of equipment components. If substantial wear does occur, the assembly includes means which can be manually adjusted to compensate for the wear. Thus, accurate and precise alignment of the clamps can be easily maintained. The assembly for opening and closing the clamps includes four elements: a cam, an actuator, a cam follower and a connector. The actuator, connected to the cam, is driven by a pneumatic cylinder to move the cam. The connector has the cam follower attached to one end and movable jaw members of the clamps attached to its other end. When the cam moves, the follower follows its movement. This causes the connecting means to move the movable jaw members between open and closed positions.

5 Claims, 8 Drawing Figures

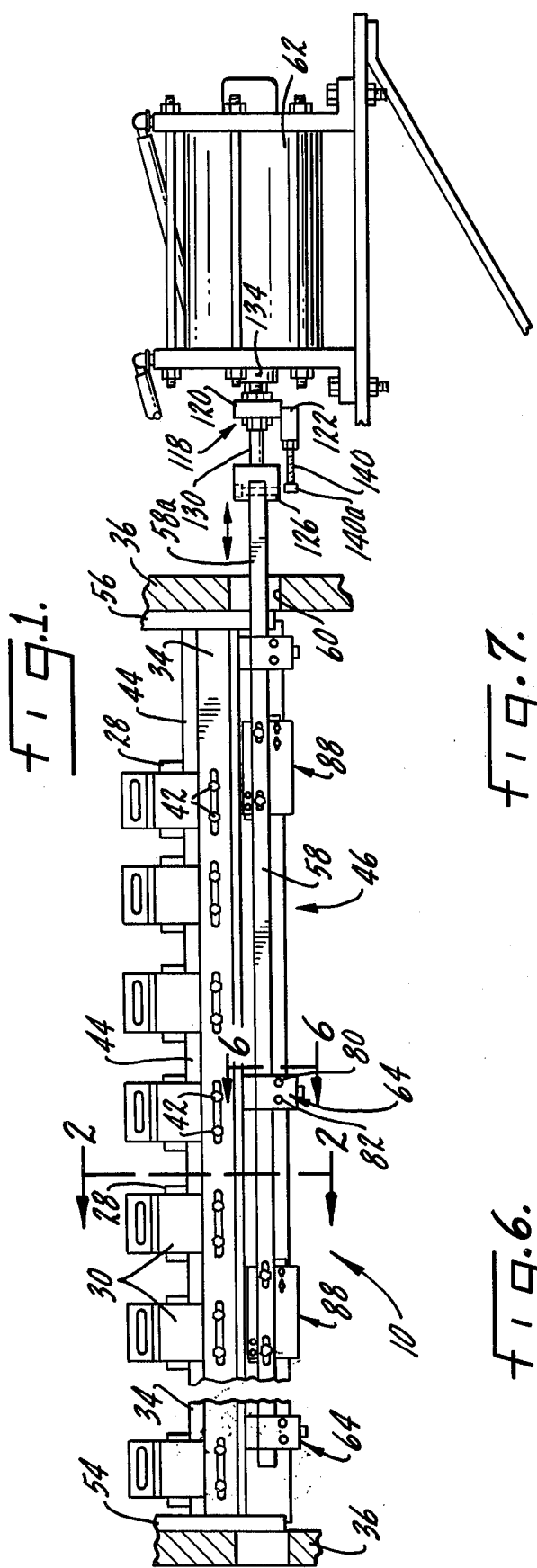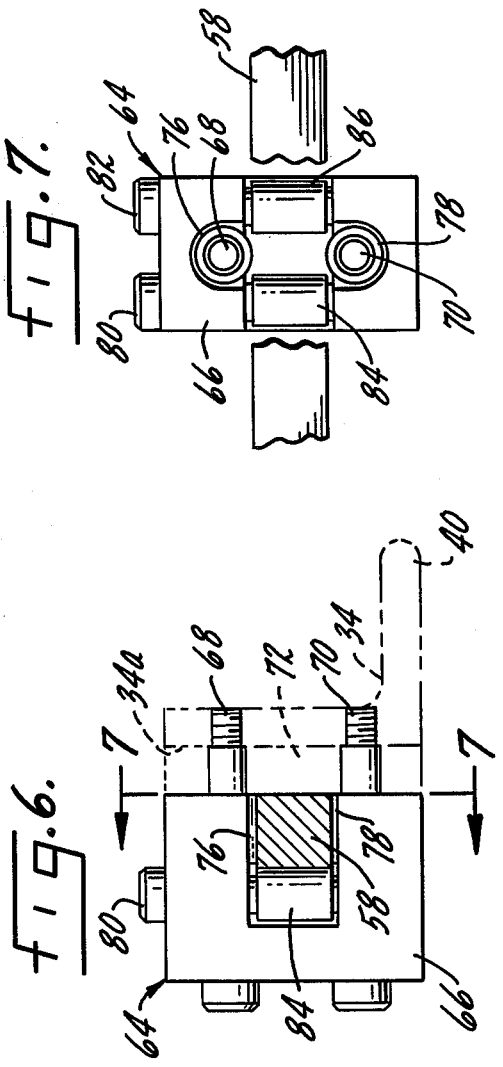

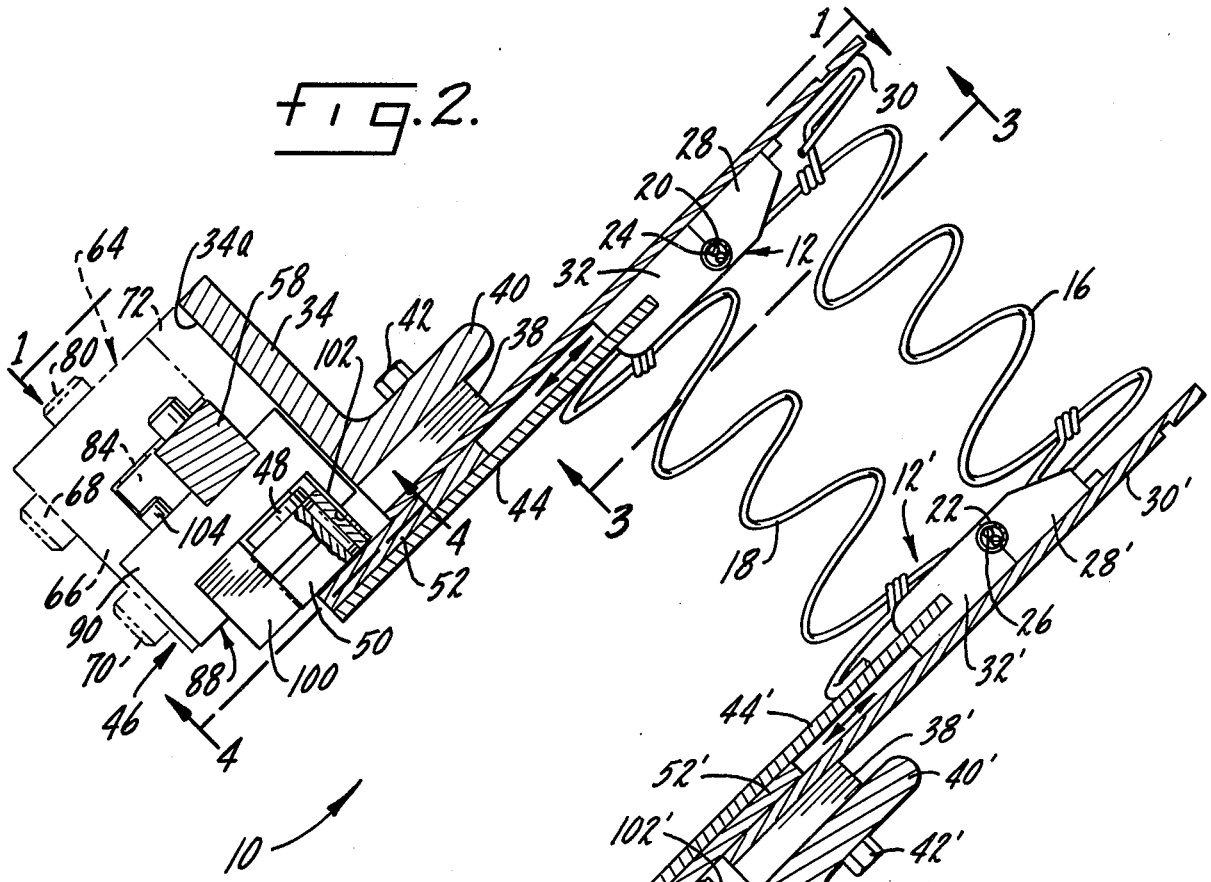
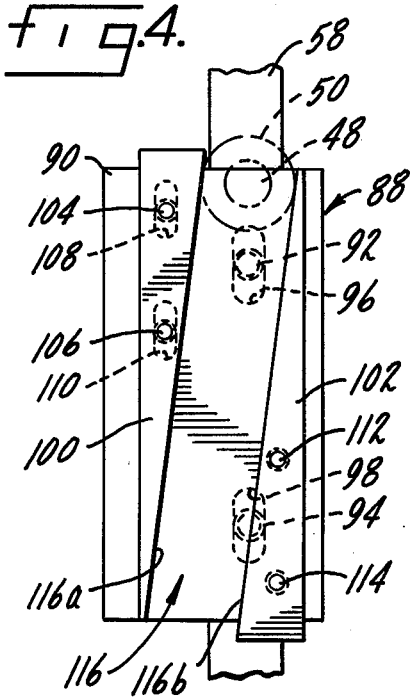
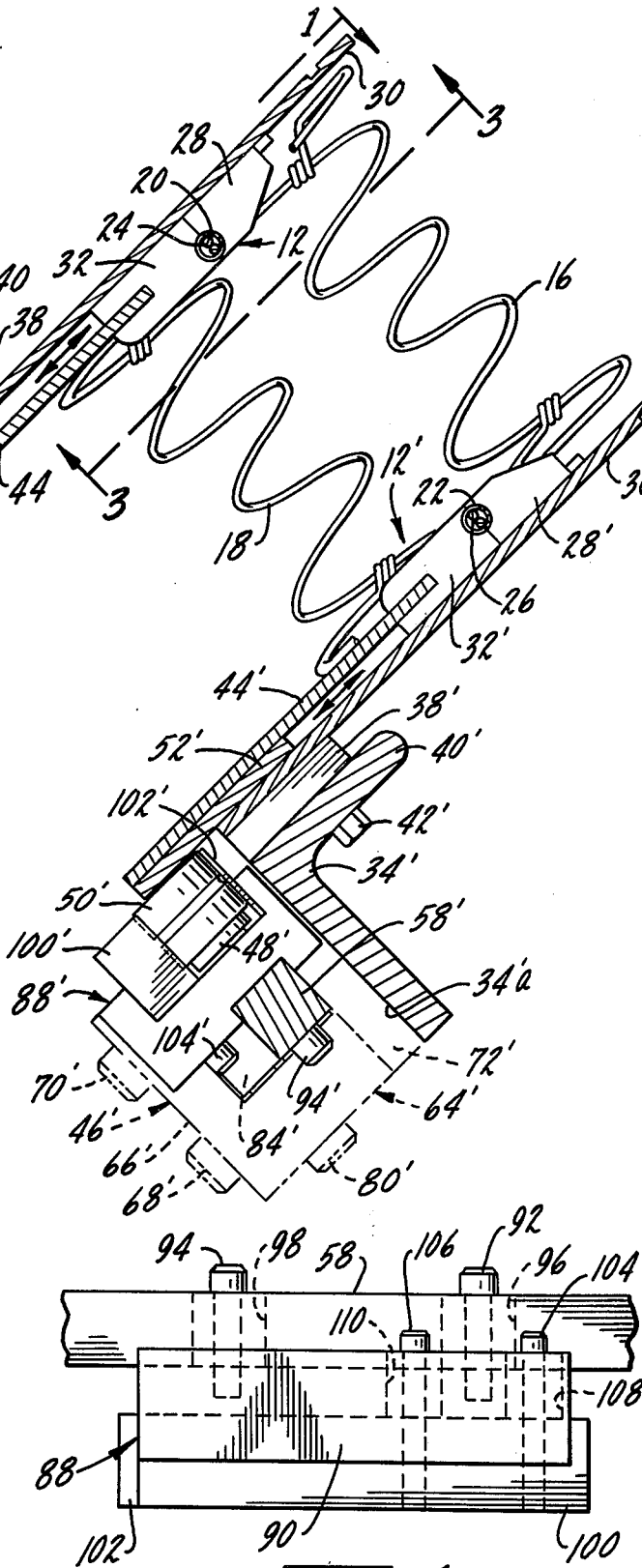

INNERSPRING MANUFACTURING EQUIPMENT

BACKGROUND

In the manufacture of innerspring mattresses adjacent, parallel rows of coiled springs are joined together at their tops and bottoms by helical wires or "pig tails." The Frank L. Wells Company of Kenosha, Wis., makes automated equipment for winding the helical wires about overlapping top and bottom portions of adjacent rows of coiled springs. This equipment includes two spaced rows of clamps which in open positions permit an attendant to place the springs between the rows of clamps. In the closed position the clamps hold the overlapping portions of the springs in precise, parallel alignment. This permits the helical wire to wind about the overlapped portions. If the springs are not parallel, the wire cannot be wound about the overlapping portions. Each of the clamps includes a movable jaw member which is moved by pneumatically driven actuators including brass guides and lugs. With prolonged use of this equipment there occurs uneven wear of these brass guides and lugs. As a consequence, the gap between jaws of the clamps, instead of remaining fixed, varies. For example, there may be as great as an eighth of an inch difference between the jaws of clamps at one end of the row from those at the opposite end of the row. Such a variance skews the rows of springs and makes it difficult or impossible for the helical wire to be wound about the overlapped portions of the springs. When this occurs the equipment must be shut down, dissassembled and repaired. As a result, considerable production time is lost and there is a corresponding increase in the unit cost of the innerspring mattresses.

THE INVENTION

We have now invented improved innerspring manufacturing equipment which includes improved apparatus for moving the clamps between open and clamping positions. Our apparatus minimizes wear of moving parts so that the likelihood of misalignment of the springs is minimized. Further, if there is misalignment, our apparatus can be easily adjusted to realign the clamps, returning the rows of springs to parallel position.

The chief components of our apparatus include two rows of clamps in spaced parallel alignment with one another. Each clamp includes a movable clamping member and an immovable clamping member. The movable member moves between a clamping position which is proximate to the immovable member and an open position which is remote from the immovable member. Moving means are provided for each row of movable clamping members, and each of these means include a cam, a movable actuator to which the cam is attached, a cam follower which follows the movement of the cam, and a connector having the cam follower attached to one end and one row of movable clamping members attached to the other end. Consequently, as the cam follower follows the movement of the cam, the connector moves the movable clamping members between the clamping and open positions.

The apparatus also includes means coupling the actuator of the first moving means to the actuator of the second moving means. Thus, the actuators move synchronously. This coupling means includes means which enable the clamping members of all the clamps to be adjusted so that the gap between each pair of members is the same for all clamps. Moving means such as a pneumatic cylinder move the actuators between a first position where the cam means close the movable clamping members and second position where the cam means open the movable clamping members. Preferably the connector and actuator move reciprocally and rectilinearly.

To compensate for wear or other causes of spring misalignment, the cam includes adjustable wedge-shaped members which can be manually repositioned to correct for misalignment. Also the cam assemblies can be relocated manually on the actuators.

The attached drawings and accompanying description thereof discloses the details of our improved apparatus.

DRAWINGS

FIG. 1 is a top plan view of the innerspring manufacturing equipment of our invention taken along line 1—1 of FIG. 2.

FIG. 2 is an enlarged cross-sectional view of this equipment taken along line 2—2 of FIG. 1. Some sections are shown broken away.

FIG. 4 is an enlarged view of the cam assemblies shown in FIGS. 1 and 2.

FIG. 5 is a side elevational view of the cam assembly shown in FIG. 4.

FIG. 6 is an enlarged view taken along line 6—6 of FIG. 1.

FIG. 7 is an enlarged view taken along line 7—7 of FIG. 6 with the bar broken away.

DESCRIPTION OF PREFERRED EMBODIMENT

Figure 3:
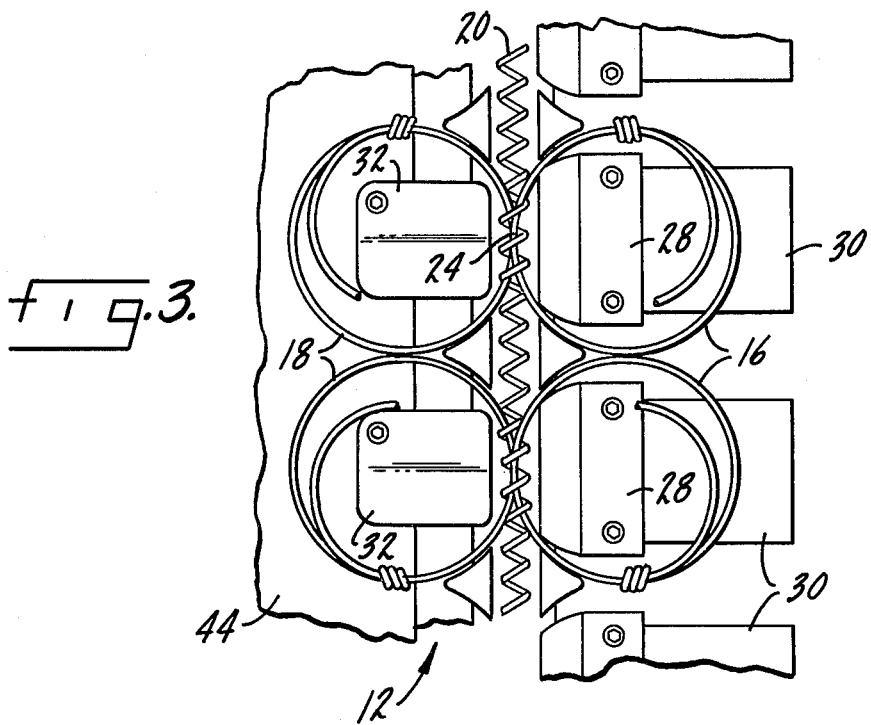
FIG. 3 is a partial sectional view taken along line 3—3 of FIG. 2, with the clamps shown in the open position.

FIGS. 1 through 3 show the innerspring manufacturing apparatus 10 of our invention. The principal components of this apparatus are two parallel rows of clamps 12 and 12' which hold two parallel rows of juxtaposed, coiled springs 16 and 18 in precise alignment while helical wires 20 and 22 are automatically wound about the top overlap 24 and bottom overlap 26 of the rows of springs. The apparatus 10 is tilted about 45° as shown in FIG. 2 to facilitate loading of springs 16 and 18. FIG. 2 illustrates the position of the springs 16 and 18 sitting on their ends, as the two helical wires 20 and 22 wind simultaneously about these springs to attach one row of springs to an adjacent row of springs. The number of springs 16 in one row is equal to the number of springs 18 in the other row. This number varies depending on mattress size, e.g., king size, regular, twin, etc.

The top row of clamps 12 is in spaced, parallel alignment with the bottom row of clamps 12'. When positioned in these clamps 12 and 12', the springs 16 and 18 are generally at right angles to the clamps. As will be described in detail below, the clamps 12 and 12' are opened and closed in synchronization so that both the top and bottom rows of clamps are opened and closed simultaneously. The clamps 12' of the bottom row are mounted, opened and closed by means which are essentially the same, both functionally and structurally, as the means for mounting, opening and closing the top row of clamps 12. Corresponding components for the bottom row of clamps are given the same number as the components for the top row of clamps. These components are also given a prime superscript to distinguish them from the top components.

Each clamp 12 in the top row includes a fixed, immovable jaw member 28 attached to a clamp plate 30 by a set screw (not shown). Each clamp 12 also includes a movable jaw member 32 which moves towards and away from the fixed member 28. Alignment pins (not shown) serve to maintain the two members 28 and 32 of each clamp 12 in proper position with respect to one another. When the movable member 32 is moved proximate the fixed member 28, it is in the clamping position as shown in FIG. 2. In the clamping position the rows of springs 16 and 18 are held in parallel position, permitting the helical wires 24 and 26 to thread easily through the springs. As shown in FIG. 3, when the movable member 32 is moved away from the fixed member 28, to a remote position from fixed member, the clamps are opened releasing the springs 16 and 18.

The mounting for the fixed jaw member 28 of the top row of clamps 12 includes a number of the clamp plates 30 attached to a rigid angle frame 34. This frame 34 has its opposite ends securely connected to the main frame 36 (only partly shown) of the apparatus 10. Spacer elements 38 are disposed between the clamp plates 30 and the base 40 of the angle frame 34, and a bolt 42 passes through an opening in the base and spacer, attaching securely the clamp plates to the angle frame.

The mounting for the movable jaw members 32 of the top row of clamps 12, includes an elongated connecting actuator plate 44 which extends along the row of clamps. Set screws (not shown) secure each movable jaw member to one edge or end of this plate 44, and a stud 48 holds a cam follower 50 to the other edge or end of this plate. The stud 48 passes through an opening in a spacer 52 and screws into the connecting plate 44. The cam follower 50 preferably is a roller and the stud 48 serves as an axle about which the roller freely revolves. Attached to the main frame 36 near opposite ends of the angle frame 34 is a pair of guides 54 and 56. The connecting plate 44 is moved by an actuator assembly 46 so that the plate rides along the guides 54 and 56 as it moves to open and close the clamps 12.

The actuator assembly 46 moves the plate 44 reciprocally, rectilinearly and generally at right angles to the springs 16 and 18. It includes a reciprocally movable actuator bar 58, and a series of bearing assemblies 64 (FIGS. 6 and 7) and cam assemblies 88 (FIGS. 4 and 5) mounted on the bar. One end 58a of the bar 58 extends through an opening 60 in the main frame 36 and is connected to a pneumatic cylinder 62 which drives the bar. The bearing assemblies 64 are attached to the side 34a of the angle frame 34, and they guide the bar 58 as it moves to and fro.

The bearing assemblies 64 are shown in detail in FIGS. 6 and 7. Each assembly 64 includes a C-shaped member 66 and a pair of bolts 68 and 70 which pass through the back of the C-shaped member and a spacer element 72 to screw into the side 34a of angle frame 34. Rotatably mounted on each of these bolts are rollers 76 and 78 (FIG. 7) respectively. Passing through the top leg of the C-shaped member 66 and into the bottom leg of this member are another pair of bolts 80 and 82. On each of these bolts 80 and 82 are carried rollers 84 and 86 that are free to revolve about the bolts. These four rollers 76, 78, 84, 86 serve as bearings over which the actuator bar 58 rides as it moves.

Spaced between the bearing assemblies 64 are the cam assemblies 88. Each of these cam assemblies 88 includes a generally U-shaped cam holder 90. A pair of bolts 92 and 94 passing through elongated slots 96 and 98, respectively, in the bar 58 fasten each of the cam holders 90 to the bar. By loosening the bolts 92 and 94 the cam holder 90 can be shifted laterally along the longitudinal axis of the bar 58. As will be discussed in greater detail below, this permits compensating adjustment for wear of equipment components or misalignment of the clamps 12 and 12'. As best shown in FIG. 4, there is seated in each cam holder 90 a pair of wedge-shaped cams 100 and 102. Screws 104 and 106 passing through elongated slots 108 and 110 in the holder 90 fasten the cam 100 to the holder. These slots 108 and 110 permit compensating adjustment of this cam 100. The other cam 102 is simply secured with screws 112 and 114, but it may be mounted similar to cam 100. This is optional. Each pair of cams 100 and 102, defines a slanted guideway 116 along which the cam roller 50 rides. The inner surfaces 116a and 116b of the cams 100 and 102 are the cam surfaces which control the extent of reciprocal movement of the movable jaw members 32 of the clamps 12. By moving the cams to different positions in holder 90, the distance jaw members 32 move is regulated.

Figure 8:
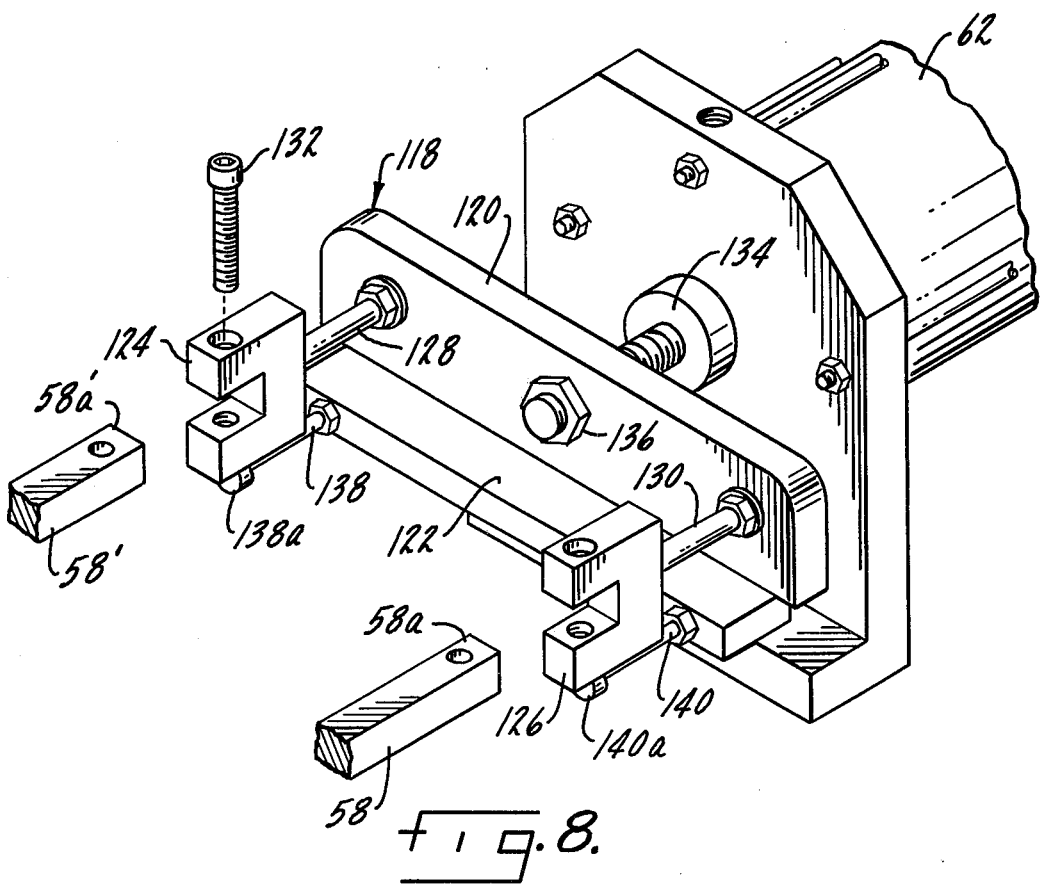
FIG. 8 is a perspective view of the coupling means which couples the clamp actuators together.

As shown in FIG. 1 and 8, a yoke 118 couples the actuator bar 58 of the top actuator assembly 46 to the actuator bar 58' of the bottom cam assembly 46'. This provides for synchronous opening and closing of the top and bottom row of clamps 12 and 12'. The yoke 118 includes a back plate 120 and a flange 122 welded to the plate 120. A pair of U-shaped members 124 and 126, secured to the back plate 120 by bolts 128 and 130 respectively, receive the ends 58a and 58'a of the bars 58 and 58'. Fasteners 132 (only one shown) secure the ends 58a and 58'a to the members 124 and 126. A screw coupling 134 adjustably connects the yoke 118 to the piston (not shown) of the pneumatic cylinder 62. Extending outwardly from the flange 122 is a pair of adjustment screws 138 and 140.

The coupling 134 is adjusted by turning a nut 136 so that, when closed, the top and bottom clamps 12 and 12' have roughly an identical closure position. That is, the spacing between the movable jaw members 32, 32' and the immovable jaw members 28, 28' of the clamps 12 and 12' for all clamps is about equal. This also will set the open position of all clamps 12 and 12' so that the spacing is about equal for all clamps. The heads 138a and 140a of screws 138 and 140 contact the main frame 36 when the yoke 118 is carried by the actuator bars 58 and 58' to the right as viewed in FIG. 1. Thus, these heads 138a and 140a serve as stops which limit the movement of the actuator bars 58 and 58'. The screws 138 and 140 serve as a fine adjustment for setting the gap between jaw members exactly equal. The distance over which the movable jaw members 32, 32' traverse and the gap between movable and immovable jaw members is precisely regulated through adjustment of screws 138 and 140.

In operation, an attendant first actuates a control switch (not shown) to initiate movement of the top and bottom jaw members 32, 32' to an open position. With the clamps 12, 12' in this open position, the attendant manually inserts juxtaposed pairs of coil springs 16 and 18 between the top and bottom rows of clamps 12, 12' so that the tops and bottoms of the rows of springs overlap. When all springs are properly positioned, the attendant again actuates the control switch to bring the top and bottom rows of clamps 12, 12' into the clamping position as shown in FIG. 2.

More specifically, air is injected into the pneumatic cylinder 62 so that the piston of the cylinder 62 moves the actuator bars 58, 58' rectilinearly to the right as shown in FIG. 1. The actuator bars 58, 58' ride along the rollers in the bearing assemblies 64, 64' and shift the position of the cam assemblies 88, 88' to the right. This moves the cams 100, 102 and 100' and 102' to the right, and this movement is followed by the rollers 50, 50'. The rollers 50, 50' ride along the surfaces of the cam wedges 100, 102 and 100' and 102' and move to the right as shown in FIG. 2. This causes connecting plates 44 and 44' to move to the right as shown in FIG. 2, carrying with them the movable jaw members 32, and 32' of the clamps 12, 12'.

With closure of clamps 12 and 12', the pair of helical wires 20 and 22 are automatically fed into the rows of springs. The wire 20 is wound around the top overlap 24 of each pair of adjacent springs and the other wire 22 is wound around the bottom overlap 26 of each pair of the adjacent springs to join the tops and bottoms of the rows of springs 16 and 18 together. When the helical wires 20 and 22 have been wound about all the springs 16 and 18, the attendant again actuates the control switch and the movable jaw members 32 and 32' move to an open position releasing the bound-together coiled springs. This is achieved by introducing air into the cylinder 62 from the opposite direction. This forces the piston of the cylinder in reverse direction, returning the actuator bars 58 and 58' to the left as viewed in FIG. 1. As a consequence, the cam assemblies 88 and 88' are moved to the left as viewed in FIG. 1. With this movement of the cam assemblies 88 and 88', the rollers 50 and 50' ride on the surfaces of the cam wedges 100, 102 and 100' and 102' to move the connecting plates 44, 44' to the left as viewed in FIG. 2, opening the rows of clamps 12, 12'. With the clamps 12, 12' open, the rows of springs 16 and 18 advance a short distance to the left as viewed in FIG. 2 so that the row of springs 16 moves to the position vacated by the row of springs 18 and only the springs 16 are held in jaw members 32, 32' of the clamps 12 and 12'. The attendant now places another row of springs in the clamps in the position vacated by the row of springs 16 and the cycle is repeated to attach the new row of springs to the row of springs 18. The operation is repeated with successive rows of springs until the desired number of rows is attached together to form an innerspring unit of the desired width.

In accordance with the principal advantage of our improved apparatus, both the holders 90, 90' and the cams 100, 100' are mounted so that they can be easily adjusted. Such adjustment may be required from time to time as the jaw members 32, 32' of the clamps 12, 12' become misaligned due to wear or other causes. For example, assume jaw members 32 wear unevenly, and as a result, during closure of clamps 12, there is a gap of one-fourth of an inch between jaw members 28 and 32 at the end of the row of clamps near guide 56, and a gap of three-eighth of an inch between jaw members 28 and 32 at the opposite end of the row of clamps near guide 54. Such a difference in gaps between jaw members 28 and 32 may prevent threading of the helical wire 20 about the springs 16 and 18. To correct this clamp misalignment, the cam assembly 88 near guide 54 is moved laterally on bar 58, so that, during closure of the clamps 12, plate 44 will be canted slightly to move the jaw member 32 closer to jaw member 28 until the gap between these members is one-fourth of an inch or equal to the gap between the jaw members at the other extreme end of the row of clamps. Moving the cam assemblies 88 is achieved simply by loosening screws 92 and 94 and shifting cam holders 90 in the slots 96 and 98 until the cam assemblies have been moved to the correct position to adjust the gap between the jaw members 28 and 32. Screws 92 and 94 are then tightened to hold the assemblies 88 in the correct position. An alternate way of correcting clamp misalignment would be to move the cams 100 in the cam holder 90. This would also cause the plate 44 to be canted slightly to bring the jaw member 32 closer to jaw member 28. This adjustment is made by simply loosening the screws 104, 106 and shifting the cam 100 to the proper position within the cam holder 90. Screws are then tightened to hold the cam 100 in the correct position. Since the cam assemblies are located at several different, spaced apart positions along the bar 58, the plate 44 can be canted or even twisted slightly to properly position jaw members 32 so that the gap between jaw members 32 and 28 is equal even though there may be uneven wear of these jaw members. Also, because the cams 100, 102, 100', 102' have a smooth flat surfaces 116a, 116b, 116a', 116b', which the cam rollers 50, 50' ride over easily, there is substantial reduction in wear compared with the prior art equipment. But if the cam surfaces do wear, the screws 104, 106, and 104', 106', are loosened and the cams 100, 102 and 100', 102', are moved to a different position to compensate for wear. Also, if the actuator bars 58, 58' wear or bend, such wear or bending can be compensated for by loosening the bolts 92, 94 and 92', 94' and adjusting the cam holders 90, 90' accordingly. The rollers in the bar holders 90, 90', however, minimize wear.

Modifications and variations can be made in the specific structure shown in the figures without departing from the novel concepts embodied in our invention as claimed below.

We claim:

1. In apparatus for joining parallel rows of coiled springs together by threading a pair of helical wires about top and bottom overlapping portions of the springs,
   a. a first row of clamping means for holding the overlapping top portions of the row of springs, and a second row of clamping means in spaced, parallel alignment with the first row of clamping means for holding the overlapping bottom portions of the springs, said rows of springs being generally disposed at a right angle to the clamping means, and each individual clamping means including a first clamping member mounted in a fixed, immovable position and a second clamping member adapted to be moved relative to the immovable clamping member between a clamping position and an open position,
   b. first moving means for the movable clamping members in the first row, and second moving means for the movable clamping members in the second row, each of said moving means including 1. cam means including a pair of spaced, wedge-shaped elements having smooth cam surfaces and holders for holding said elements spaced relative to each other to define between said smooth cam surfaces a slanted guideway, at least one of said wedge-shaped elements being attached to the cam holders by fastener means which pass through an elongated slot in the cam holders, said slot permitting the wedge-shaped element to be manually relocated in the cam holder, 2. an actuator to which the cam means is attached, said actuator being adapted to move the cam means and including i. a movable bar member having the cam holders attached to the bar member by fastener means which pass through an elongated slot in the bar member, said slot permitting the cam holder to be moved to compensate for wear of apparatus components or misalignment of the clamping means, and ii. bar holders for guiding the movement of said bar member, said bar holders including roller means as bearing over which the bar member rides, 3. cam follower means which follows the movement of the cam means, said follower means including a roller which rides along the guideway over the smooth cam surfaces of the wedge-shaped elements, and 4. connecting means having attached to one end the roller of the cam follower and to the other end one row of the movable clamping members, so that as the roller follows the movement of the wedge-shaped elements the connecting means moves the movable clamping members between clamping and open positions, c. means for coupling the bar member of the first moving means to the bar member of the second moving means so that said bar members move synchronously, and d. power means for moving the bar members between a first position where the cam means close the movable clamping members and a second position where the cam means open the movable clamping members.

2. The apparatus of claim 1 where the movable clamping members of the clamping means and the movable bar members of actuators move reciprocally and rectilinearly.

3. The apparatus of claim 1 where the means for coupling the bar members includes adjusting means which permits the gap between pairs of clamping means to be adjusted so that this gap is equal for all clamps.

4. Apparatus comprising clamping means movable between open and closed positions, and means for moving said clamping means between said open and closed positions including a. an actuator comprising a movable member having an elongated slot therein, b. cam means attached to the actuator, said cam means including a pair of wedge-shaped elements, a holder for said wedge-shaped elements, and a cam follower roller which engages said wedge-shaped elements, said holders being attached to the actuator by fasteners which pass through the elongated slot in the actuator and screw into the holder and said wedge-shaped elements being attached to the holder by fasteners which pass through openings in the holder and screw into the wedge-shaped elements, at least one of said wedge-shaped elements having the openings therein elongated, and each of said elements having at least one smooth cam surface over which the cam follower roller rides, said elements being spaced in the holder to define therebetween a guideway for the roller, and c. connecting means having attached to one end of the cam follower roller and at the other end the clamping means, so that as the roller follows the movement of the cam means, the connecting means moves the clamping means between clamping and open positions, and d. power means for moving the actuator between a first position where the cam means closes the clamping means and a second position where the cam means opens the clamping means.

5. The apparatus of claim 4 where the movable member is a bar movable between said first and second positions, and the apparatus includes bar holders having roller means which serve as bearings over which the bar rides when it is moved between the first and second position.

* * * * *